United States Patent [19]

Erdmannsdoerfer et al.

[11] Patent Number: 5,028,405

[45] Date of Patent: Jul. 2, 1991

[54] PROCESS AND APPARATUS FOR THE BURNING OFF OF CARBON (SOOT) DEPOSITED ON EXHAUST GAS FILTERS

[75] Inventors: Hans Erdmannsdoerfer, Ludwigsburg; Rudi Numrich, Weinstadt; Gerd Weyh, Leonberg-Eltingen; Manfred Wagner, Stuttgart; Fritz Zundel, Besigheim, all of Fed. Rep. of Germany

[73] Assignee: Filterwerk Mann & Hummel GmbH, Ludwigsburg, Fed. Rep. of Germany

[21] Appl. No.: 239,359

[22] Filed: Sep. 1, 1988

[30] Foreign Application Priority Data

| | | | |
|---|---|---|---|
| Sep. 4, 1987 | [DE] | Fed. Rep. of Germany | 3729667 |
| Oct. 20, 1987 | [DE] | Fed. Rep. of Germany | 3735412 |
| Jun. 23, 1988 | [DE] | Fed. Rep. of Germany | 3821143 |

[51] Int. Cl.[5] .................... B01D 53/36; B01D 46/04; F01N 3/34; F01N 3/38

[52] U.S. Cl. .................................. 423/215.5; 55/96; 55/283; 60/295

[58] Field of Search ........................ 60/278, 295, 311; 423/215.5; 55/96, 272, 283, 466

[56] References Cited

U.S. PATENT DOCUMENTS

| | | | |
|---|---|---|---|
| 3,370,419 | 2/1968 | Ketzer | 60/295 |
| 4,281,512 | 8/1981 | Mills | 55/283 |
| 4,436,535 | 3/1984 | Erdmannsdoerfer et al. | 55/96 |
| 4,474,580 | 10/1984 | MacKenzie | 44/68 |
| 4,516,990 | 5/1985 | Erdmannsdoerfer et al. | 55/96 |
| 4,631,076 | 12/1986 | Kurihara et al. | 55/466 |
| 4,646,516 | 3/1987 | Bostock | 60/295 |
| 4,655,037 | 4/1987 | Rao | 60/295 |
| 4,670,233 | 6/1987 | Erdmannsdoerfer et al. | 423/213.2 |
| 4,730,454 | 3/1988 | Pischinger et al. | 60/274 |

FOREIGN PATENT DOCUMENTS

| | | |
|---|---|---|
| 2128113 | 12/1971 | Fed. Rep. of Germany . |
| 3111228 | 9/1982 | Fed. Rep. of Germany . |
| 3516360 | 11/1986 | Fed. Rep. of Germany . |
| 3615218 | 11/1986 | Fed. Rep. of Germany . |
| 3538155 | 4/1987 | Fed. Rep. of Germany . |
| 3717140 | 12/1988 | Fed. Rep. of Germany . |
| 1350259 | 4/1974 | United Kingdom . |

*Primary Examiner*—Jeffery E. Russel
*Attorney, Agent, or Firm*—Foley & Lardner

[57] ABSTRACT

The invention relates to a process for the discontinuous burning off of carbon deposited on the heat-resistant exhaust gas filter of an internal combustion engine, particularly a diesel internal combustion engine. At least one metal must be present during this process. The problem of ensuring the combustion of the carbon at the minimum temperature and of achieving a long filter life, is solved in a particularly advantageous manner through the use of an organic complexing agent able to form a complex with the metal and/or an organo-metallic complex compound of the metal with the organic complexing agent.

The invention also relates to an apparatus for performing the inventive process. For this purpose, the exhaust gas filter preferably has at least two, at least temporarily separately operable filter units.

42 Claims, 2 Drawing Sheets

PROCESS AND APPARATUS FOR THE BURNING OFF OF CARBON (SOOT) DEPOSITED ON EXHAUST GAS FILTERS

DESCRIPTION

The present invention relates to a process for the discontinuous burning off of carbon (soot) in the presence of at least one metal. During this process the carbon is deposited on a heat-resistant exhaust gas filter of an internal combustion engine, particularly a diesel internal combustion engine.

As carbon emissions, particularly in the case of diesel engines, are to be further reduced for environmental protection reasons, it is necessary to filter the carbon particles out of the exhaust gas flow. The separated carbon gradually clogs the filter material during the operation of the internal combustion engine, so that the filter has to be constantly regenerated. This can take place during the operation of the diesel internal combustion engine by burning the carbon. However, as an automatic starting of the burning off process does not take place under reproducible conditions and is consequently of an arbitrary nature, carbon combustion must be initiated in a controlled manner. The initiation and maintaining of a controlled burning off process for the carbon particles on the filter can take place through the introduction of additives. These additives inter alia ensure that the carbon ignition temperature is reduced.

Such processes have already been described. Thus, U.S. Pat. No. 4,436,535 uses copper or copper salts, in particular copper (I) chloride as an additive for reducing the ignition temperature. In this case the copper (I) chloride is added to the exhaust gas flow in finely divided form.

In order to increase the life of the filter and still further reduce the carbon ignition temperature, U.S. Pat. No. 4,516,990 proposes additionally admixing ammonium nitrate with the copper (I) chloride.

A further improvement to the combustion of the carbon is provided by U.S. Pat. No. 4,670,233, where the carbon particles are burnt by adding a peracid oxidizing agent selected from the group consisting of peracids and salts thereof.

However, all three of the above processes do not function in an optimum manner. Thus, the copper (I) chloride can lead to a reduction of the permeability of the filter as a result of its deposition thereon in the form of copper oxide. As a result of its chemical characteristics, copper perchlorate requires certain safety precautions to be taken. Moreover, all the compounds described as additives in the aforementioned specifications contain chlorine. However, if suitable measures are not taken, chlorine leads to increased corrosion and is prejudicial to the environment.

The problem of the present invention is therefore on the one hand to enable the burning of the carbon to take place in a clearly defined manner at low ignition temperatures and on the other hand to achieve a long filter life, linked with minimum prejudice to the environment.

According to the invention this problem is solved in that the additive used for burning is an organic complexing agent suitable for complex formation with the metal and/or an organometallic complex compound of the metal with the organic complexing agent.

The filter used in the invention can be an exhaust gas filter known from the aforementioned prior art. It e.g. comprises wound mineral fibres, which are preferably formed from boron—aluminium—silicates.

The metal bound in the organometallic complex compound or located on the filter material is preferably a transition metal and in particular the two metals iron and copper, the latter being used in particularly preferred manner according to the invention.

According to the inventive process preferably an organometallic complex compound is used, which contains the organic complexing agent as the anion and the metal as the cation, i.e. in a type of salt form. As the complexing agent itself forms the anion and consequently ensures the charge equalization of the complex salt, no additional anions occur. This is a further advantage of the invention, because in this way no further substances prejudice the environment. The organic complexing agent is in particular constituted by a compound, which can form a volatile organometallic complex compound with the metal. Although the precise reaction mechanism during the burning of carbon on an exhaust gas filter is not yet known, it can be assumed that the volatility of the organo-metallic complex compound is advantageous for reducing the ignition temperature and for ensuring a complete combustion at all points of the filter. The inventive process gives preference to the use of a compound as the organic complexing agent which is able to form an enol structure. These compounds are preferably $\beta$-diketones and in particular acetylacetone (2,4-pentanedione). In the case of acetylacetone the tautomeric keto-enol-equilibrium is far to the side of the enol form. The enol form proportion in the liquid phase is 72% and in the vapour phase 100%. The enol form reacts with many metals, e.g. to metal-acetylacetonates. Thus, according to a preferred embodiment copper (II) acetylacetonate is used in the inventive process as the organometallic complex compound.

The process as claimed in the invention can in particular be such that the metal is already located on the exhaust gas filter e.g. in complex form or preferably in the form of one of its oxides. For this purpose the filter material can be impregnated or coated with the metal complex or metal oxide. Thus, e.g. the filter material is immersed for a certain time in a metal complex suspension, such as e.g. a copper acetylacetonate suspension, or the filter material is treated for the deposition of metal oxide with metal compounds, such as e.g. a copper nitrate solution.

If e.g. the metal oxide is already on the filter material, there are various possibilities for advantageously performing the inventive process. An example of such a possibility is the direct use of the organic complexing agent. Together with the metal oxide the complexing agent then evolves the necessary catalytic action for carbon combustion directly on or above the filter. It is possible to compensate for any metal loss resulting from the discharge of small amounts of metal oxide, particularly during the formation of volatile complexes, in the case of the addition of larger organic complexing agent quantities. According to another embodiment of the invention, it is advantageous to substitute the metal oxide to a desired extent. This can take place in that the organic complexing agent is added in combination with the organometallic complex compound. It is particularly preferable to use a liquid organic complexing agent, so that the organometallic complex compound is added dissolved therein. This not only leads to the compensation of the metal losses on the filter material, but simple dosing in can take place, because the additive used is a liquid. This dosing in liquid form or also the replenishment of any metal losses can, according to a further development of the inventive process, also be achieved in that the organic complexing agent and/or organo-metallic complex compound are added in a solvent. The solvents are preferably organic solvents, e.g. alcohols, ketones, aromatic hydrocarbons, etc.

According to the invention it is also possible to advantageously use a filter containing no metal oxide on the filter material. It is then preferably possible to dose in the organometallic complex compound in the desired amount and in particular in finely divided powder form upstream of the filter material. The powder is hereby deposited on the filter material and in this way also leads to the advantageous effects according to the invention. The more finely crystalline the powder used, the better the action. Thus, the screen analysis of a copper (II) acetylacetonate quantity typically used according to the invention reveals that approximately 75% of all particles are smaller than 80 μm and 85% of all particles are smaller than 100 μm. The further addition can then also take place in liquid or dissolved form.

According to all the embodiments of the described inventive process the organic complexing agent and/or the organometallic complex compound, as well as optionally further additives are only added following the combustion of the fuel. Following fuel combustion the aforementioned additives are added for carbon combustion and particularly in a dosed quantity, upstream of the filter and preferably directly on the latter. The initiation of the burning off process in particular takes place at temperatures above 250° C. This addition can e.g. take place in that the organic complexing agent and/or the organometallic complex compound, as well as optionally further additives are atomized through a nozzle positioned upstream of the filter material. Air, preferably compressed air can be used for this atomization process. This dosing air flow can be maintained for up to ten minutes following the initiation of the burning off process and in this way can maintain the subsequent combustion. Thus, the air and in particular the compressed air serves to atomize the additive for the inventive process, as a flow medium transports the additive to the filter material and additionally makes oxygen available.

The inventive process can be performed in such a way that either both the initiation of combustion and the combustion process takes place completely in the exhaust gas flow or at least the initiation of combustion completely takes place in air, preferably compressed air. Preference is given to the inventive embodiment in which the initiation of the burning off process and the actual burning off takes place in air, preferably compressed air. In particular, the process can be performed in such a way that the duration of dosing in the dosing air flow substantially coincides with the duration of the burning off process.

However, it is also possible to perform the inventive process in such a way that the burning off process is initiated by the dosing in of air, particularly compressed air and subsequently, for maintaining said burning off process, an optionally dosed, exhaust gas flow is passed through the filter material and with it is preferably admixed air.

The additive quantity which can be used for performing the process is dependent on the nature and number of the process stages. Normally quantities of 10 to 100 mg of metal complex and/or complexing agent per 100 $cm^2$ of filter surface are sufficient to initiate regeneration. If exhaust gas flows through the filter material, e.g. during the dosing in of the igniting agent, it may be necessary to add larger quantities of organic complexing agent and/or organometallic complex compounds. However, if the exhaust gas flow through the filter material is interrupted during dosing in, it is possible to add smaller additive quantities. Moreover, as a result the metal oxide losses can be kept much smaller.

It has been found that particularly favourable results are obtained if in the case of a subdivided filter surface the burning off of the carbon is only performed on part of the available filter surface. It is also particularly advantageous if no exhaust gas flows through said part of the filter surface during the initiation of the burning off process. In this type of filter regeneration less metal complex, which has not yet evolved its catalytic activity, and also less metal oxide are discharged through the complexing agent.

The combustion of the carbon advantageously takes place in that as from a predetermined pressure difference between the pressure upstream and downstream of the filter and at an adequate temperature for combustion the organic complexing agent and/or the organometallic complex compound is applied in finely divided form to one part of the filter surface and as a result combustion is initiated. In particular, the inventive process can take place in such a way that the filter surface where carbon combustion is to occur is separated from the exhaust gas flow prior to the initiation of the burning off process. Initiation of carbon combustion then takes place through the addition of additives. Finally and in particular after a predetermined time, e.g. 3 to 5 minutes following the initiation of the burning off process, the exhaust gas can again be passed through the separated part of the filter surface. At a temperature adequate for combustion and as a function of the now prevailing pressure difference between the pressure upstream and downstream of the filter, or preferably substantially directly following the burning off of the first part of the filter surface, a further or residual part of the filter surface can be subjected to carbon combustion in the same manner as described hereinbefore.

As has been indicated, the inventive process can be performed in a plurality of combined process stages in the case of a subdivided filter surface. For example, if there is a large number of filter cartridges, it is inter alia possible to successively regenerate the individual cartridges by burning off the carbon. As a function of the particular requirements, it can also be advantageous to simultaneously regenerate several cartridges. However, there can always be a sufficiently large proportion of the filter surface through which the exhaust gas flow can pass to ensure that travelling or the operation of the internal combustion engine is not impaired. Thus, all embodiments realizing the features of the inventive process, either singly or in combination, are to be covered.

If, according to a preferred embodiment, in which the burning off of the carbon takes place without simultaneous flow of exhaust gas through the filter material, e.g. pure copper (II) acetylacetonate is used as the additive, then the additive quantity to achieve a once and for all burning off is approximately 2 g for 14 filter cartridges (approximately 10,000 $cm^2$ cartridge surface). This corresponds to a quantity of approximately 20 mg of copper (II) acetylacetonate per 100 $cm^2$ of cartridge surface. The layer thickness of the filter material of the cartridges is not taken into account in this connection. If in the same preferred embodiment pure acetylacetone is used as the additive, then approximately 5 to 10 ml per 14 cartridges are used for a burning off process, preference being given to the lower range. The more acetylacetone that is added, the more copper oxide can be discharged. As a function of the operating conditions, these copper oxide losses are approximately 50 mg to max 150 mg. However, according to the invention it is possible in simple manner to replace this discharged copper oxide by the addition of copper (II) acetylacetonate, as has already been described.

It is particularly advantageous in one of the preferred embodiments if the organic complexing agent and/or the organometallic complex compound is added discontinuously, i.e. only for initiating the particular burning off process. Surprisingly the combustion of the carbon is initiated best if the complete additive portion is applied all at once to the filter material and preferably within 2 to 3 seconds. After a predetermined period of time, which is preferably 3 to 5 minutes as from the addition of the additive, it is possible for the exhaust gas to again flow through that part of the filter surface on which the carbon was burnt. Any unburnt carbon still present continues to burn off in the exhaust gas flow.

For the better transport of the additive on the filter material scavenging with air, preferably compressed air can take place prior to introduction of the additive. It is also very advantageous to add air, preferably compressed air following dosing in. Compressed air is a preferred medium constituting an oxygen donor and for scavenging and dosing, because it is available in adequate amounts, particularly in trucks.

In certain circumstances carbon combustion can be further optimized in that for obtaining a more uniform temperature distribution the air, particularly the compressed air, is warmed up before or during the introduction of the additive. Thus, together with the additive warmed air and preferably compressed air is brought into the vicinity of the filter material.

Additionally and advantageously it is possible to supply further ignition aids or oxygen donors, such as ammonium nitrate, cellulose nitrate and/or other organic nitro compounds for reducing the ignition temperature. However, the addition of these agents only as an exception in individual cases, e.g. if the operation of the vehicle is such that the ignition temperature adequate for combustion is not reached.

Thus, the aforementioned process makes it possible to regenerate the carbon filter in a careful, simple and effective way.

Unlike in many other known processes, it is not necessary when using the inventive process to provide additional, complicated burner systems or electrical equipment. There is also no need to design the systems for much higher temperatures during combustion, so that the systems operating in accordance with the invention have a good service life. It is also not necessary for the vehicle driver to initiate combustion in any way.

The invention also covers an apparatus for performing the inventive process. In order to be able to perform the preferred embodiments of the invention in an advantageous manner, the filter preferably has at least two, at least temporarily separately operable filter units. Advantageously at least one filter unit is constructed so as to be disconnectable from the exhaust gas flow, whilst at least one other unit is available for the further operation of the internal combustion engine. Thus, filter regeneration is still possible during the operation of the internal combustion engine when said regeneration takes place whilst excluding exhaust gas from said engine.

The apparatus can advantageously be constructed in such a way that it has return lines for returning the combustion exhaust gases of the carbon to be burnt and which link the filter units with in each case one other filter unit. The apparatus can be constructed in such a way that the return line is connected to the intake manifold of the engine. The gas quantity (<0.5 $Nm^3$/min) flowing through the filter unit separated from the exhaust gas flow during the regeneration time of 3 to 5 minutes is led through said apparatus to the intake side of the engine, so that the copper in said gas quantity is not discharged with the exhaust gas and instead passes through the engine into another operating filter unit and is there again deposited on the filter material. This makes it possible to largely obviate copper replacement. The copper discharged with the exhaust gas in the form of copper acetylacetonate is oxidized by the reaction conditions in the engine combustion chambers and is consequently available again as copper oxide on the filter material of another filter unit.

Between the output side of the filter unit and the engine induction side can be provided a further filter, which is suitable for the deposition of solids. This is advantageous if on the one hand the copper is not to be discharged with the exhaust gas into the environment, but on the other hand the introduction of copper into the engine is to be prevented. The apparatus can also be constructed in such a way that there is a common filter for several return lines of several filter units. The operating temperature of such an additional filter for solids is kept under approximately 200° C., so that the discharged copper acetylacetonate is present in solid form and can be separated by the filter. In this embodiment copper replacement can take place on the filter units for burning off the carbon.

According to another construction of the inventive apparatus the return line emanating from a filter unit is directly connected to the inlet side of another filter unit. Thus, the discharged copper is also brought on to the filter material of an operating filter unit and the copper losses are also not emitted. In this constructional mode of the apparatus, it is advantageous for the connection of the return line to the other filter unit to take place at a point where, during operation, there is a relative vacuum. There is no need to provide separate circulating means, particularly if the regenerating process takes place by means of compressed air under an overpressure.

BRIEF DESCRIPTION OF THE DRAWINGS

Three preferred embodiments of the inventive apparatus are diagrammatically shown in the three figures of the drawings. They are limited to the diagrammatic representation of two filter units, which can in turn have numerous filter cartridges. The two filter units can be housed as a pair in a housing provided with a partition and which corresponds to a normal exhaust muffler or silencer. Conventionally, but not necessarily, the above-atmospheric pressure in such a housing in the case of a carbonized filter is 100 to 200 mbar, but is 10 to 20 mbar when the filter has just been cleaned (burnt off). However, the inventive features, either singly or in combination with one another, can not only be used in the case of two filter units, but also in the case of a random larger number of filter units.

Figure 1:
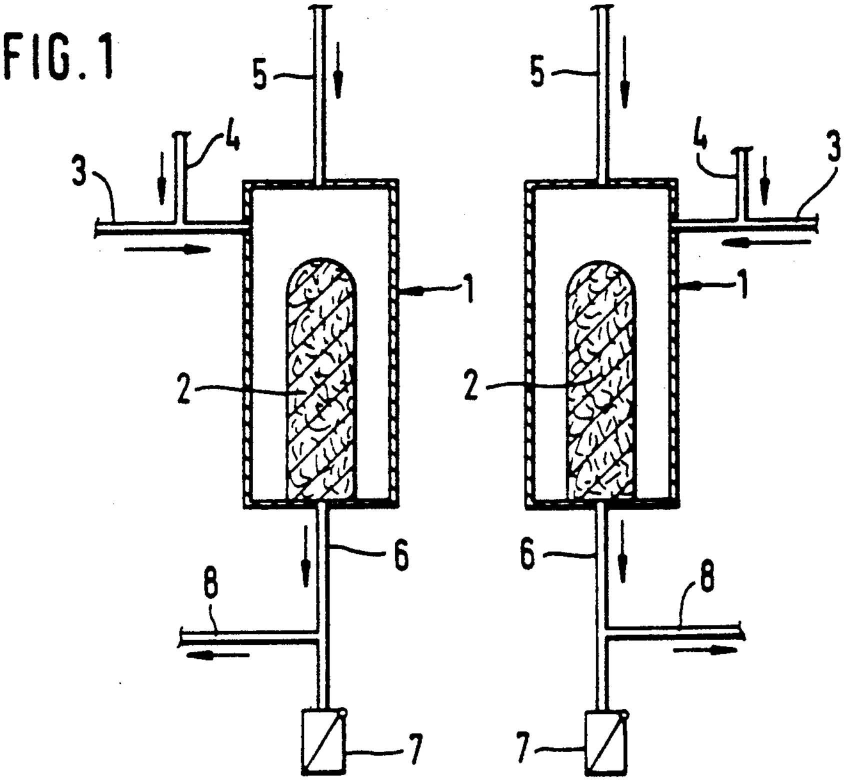
FIG. 1 shows an apparatus comprising two filter units 1, in which the filter unit 1 provided with the filter material 2 has a feedline 5 for the exhaust gas from the engine and a discharge line 6 for the exhaust gas passing out of filter unit 1. In the filter unit 1 there is also a feedline 3 for the compressed air, which is linked with the device 4 for supplying measured amounts of the additive. A return line 8 branches off from the discharge line 6 and leads to the induction side of the engine. At the end of the discharge line 6 is provided a non-return or check valve 7, such as is conventionally used on the ends of exhaust gas lines. Through the check valve 7 the gas quantity flowing during the burning off of the carbon through the filter unit 1 separated from the exhaust gas flow is passed to the intake side of the engine and the copper in said gas quantity is consequently passed via the engine to another operating filter unit.
Figure 2:
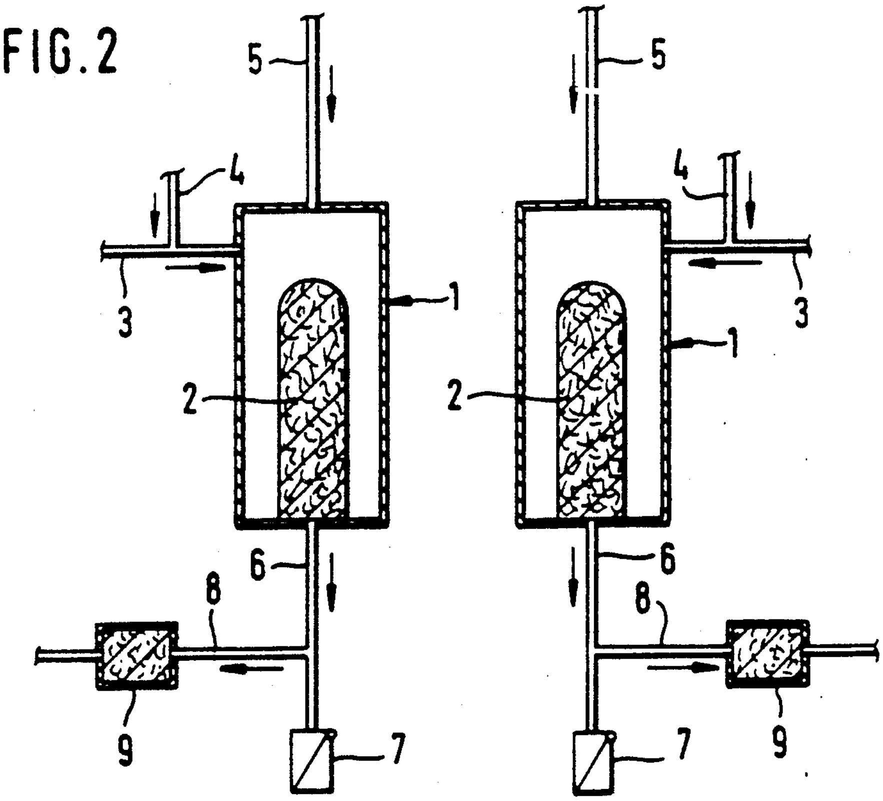

The apparatus shown in FIG. 2 is only modified compared with that of FIG. 1 in that in the return line leading to the induction side of the engine is provided with a filter 9 suitable for the separation of solids. This apparatus could also be constructed in such a way that filter 9 constitutes a common filter for the two return lines 8 shown in FIG. 2. As a result of this construction of the apparatus with a further filter, it is possible to use the suction or intake capacity of the engine for filtering the copper present in the gas out of the exhaust gas flow.

Figure 3:
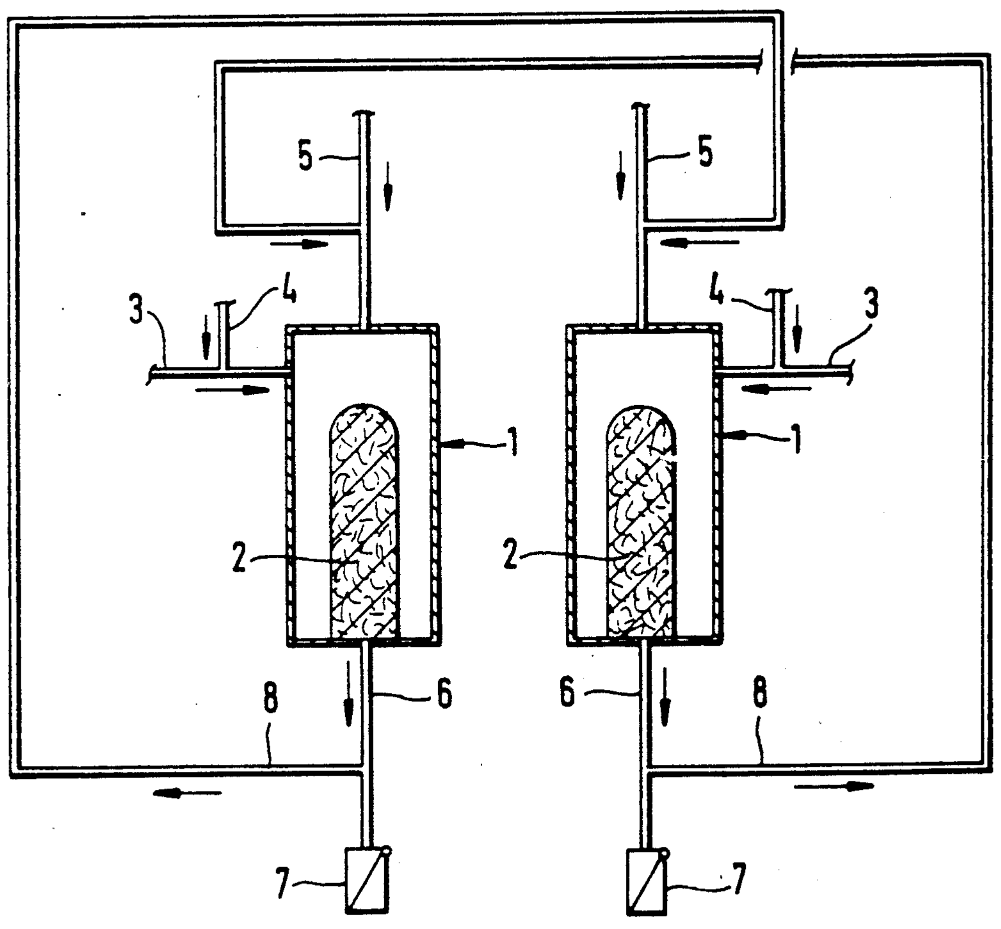

FIG. 3 also shows an apparatus comprising two filter units 1, whose features are identical to those of the apparatuses of FIGS. 1 and 2. However, in this case the return lines 8 emanating from filter units 1 are directly connected to the feedlines 5 of the adjacent filter unit. As a result the returned gas flow with the copper contained therein is brought to the adjacent, operating filter unit. At the point where the return lines 8 open into the feedlines 5 for the exhaust gas, it is possible to provide a constriction of the feedline which is not shown in the drawing. The resulting vacuum can be used for transferring the returned gas flow to the adjacent filter unit.

The following examples show preferred embodiments of the inventive process.

EXAMPLE 1

Through the operation of a diesel internal combustion engine, carbon is deposited on a filter unit comprising 14 filter cartridges according to FIG. 1, whose filter material comprises fibres impregnated with copper oxide. When the pressure difference between the pressure upstream of the filter and that downstream of the filter has reached a value of 100 to 200 mbar, the filter unit is separated from the exhaust gas flow. To the filter material is then dosed a quantity of 5 ml of acetylacetone per 14 cartridges, which corresponds to a quantity of 0.05 ml of acetylacetone per approximately 100 $cm^2$ of filter cartridge surface (without taking account of the filter material layer thickness) with the aid of compressed air. Ignition takes place automatically at temperatures above 250° C. During the burning off of the carbon the air flow continues to flow through the filter unit separated from the exhaust gas flow. During this regeneration time of 3 to 5 minutes, in accordance with FIG. 1, this gas quantity flowing through the filter unit is led by a return line to the engine induction side. Any discharged copper acetyl-acetonate quantities contained in the gas flow are converted in the combustion chambers of the engine (diesel internal combustion engine) into copper oxide and with the exhaust gas this is deposited again on the filter material of another filter unit through which the exhaust gas flows. The process can be performed completely automatically.

EXAMPLE 2

Example 1 is repeated with a filter unit comprising 14 filter cartridges in accordance with FIG. 2 and whose filter material formed by fibres is also preimpregnated with copper oxide. In order that any discharged copper cannot enter the engine, a further filter element is provided in the return line between the outlet side of the filter unit and the engine induction side. The operating temperature of this filter element is kept below approximately 200° C. Thus, any copper acetylacetonate entrained during the carbon combustion with the gas flow is present in solid form and is deposited on the filter. In order during this procedure to replace the copper on the filter material of the filter unit for carbon separation, on reaching the pressure difference in the filter unit according to example 1 a quantity of 5 ml of acetyl-acetone per 14 cartridges (0.05 ml of acetylacetone per approximately 100 $cm^2$ of filter cartridge surface), in which copper acetylacetonate is dissolved for compensating the copper losses is dosed on the filter material.

According to example 2 also solid copper acetylacetonate can be dosed on the filter material for initiating the burning off of the carbon. For this purpose it is in particular possible to use copper acetylacetonate with a fineness at which approximately 75% of all particles are smaller than 80 μm.

EXAMPLE 3

On a filter unit according to examples 1 and 2 (14 filter cartridges, fibrous filter material preimpregnated with copper oxide) through the operation of a diesel internal combustion engine carbon is deposited in an apparatus according to FIG. 3. On reaching the pressure difference between the pressure upstream and downstream of the filter of 100 to 200 mbar, the filter unit is separated from the exhaust gas flow and using compressed air 5 ml of acetylacetone per 14 cartridges (0.05 ml of acetylacetone per approximately 100 $cm^2$ of filter cartridge surface) is dosed to the filter material. Carbon combustion is automatically initiated at above 250° C. The airflow continuing to flow through the filter unit during the burning off time of 3 to 5 minutes is led by means of a return line directly to the inlet side of a second filter unit. As a result any copper entrained with this gas quantity is brought on to the filter material of another operating filter unit and the copper is not emitted.

According to example 3, through the use of copper acetylacetonate dissolved in acetylacetone, there can be an after-dosing of copper to the filter material.

EXAMPLE 4

A filter unit comprising 14 filter cartridges, not having return lines as shown in FIGS. 1 to 3 and whose filter materials are not preimpregnated has carbon deposited on it through the operation of a diesel internal combustion engine. As soon as the pressure difference upstream and downstream of the filter has a value between 100 and 200 mbar, the filter unit is separated from the exhaust gas flow. Then, with the aid of compressed air, 4 g of iron acetylacetonate per 14 cartridges, corresponding to 40 mg of iron acetylacetonate per approximately 100 $cm^2$ of filter cartridge surface (not taking account of the filter material layer thickness) is applied to the filter material. The dosed in iron acetylacetonate has a fineness such that approximately 75% of the particles are smaller than 80 μm. Ignition takes place automatically at temperatures above 250° C. Example 4 can also be performed in such a way that the iron acetylacetonate is dosed in dissolved in acetylacetone.

Following a burning off period of 3 to 5 minutes, the compressed air supply is switched off and the exhaust gas again flows through the filter unit freed from carbon and in the case of an apparatus comprising two filter units with in each case 14 filter cartridges, now both filter units are operating again. As soon as the pressure difference upstream and downstream of the filter reaches a value in one of these two filter units which is necessary for initiating the carbon burning off process, a regeneration process again takes place in said filter unit, whilst the exhaust gas continues to flow through the other filter unit.

We claim:

1. A process for intermittently burning off carbon deposits from a heat-resistant exhaust gas filter of an internal combustion engine, said process comprising following combustion of fuel in said engine, periodically applying a combustion initiating agent directly to said filter at a temperature sufficient to initiate combustion, said agent being applied in the presence of at least one complex forming metal, and said agent being selected from the group consisting of an organic complexing agent able to form a complex with said metal and an organometallic complex compound of said metal with an organic complexing agent, wherein an organometallic complex compound is used, which contains the organic complexing agent as the anion and the metal as the cation.

2. A process for intermittently burning off carbon deposits from a heat-resistant exhaust gas filter of an internal combustion engine, said process comprising following combustion of fuel in said engine, periodically applying a combustion initiating agent directly to said filter at a temperature sufficient to initiate combustion, said agent being applied in the presence of at least one complex forming metal, and said agent being selected from the group consisting of an organic complexing agent able to form a complex with said metal and an organometallic complex compound of said metal with an organic complexing agent, wherein the combustion initiating agent is added in an organic solvent for initiating the burning off process.

3. A process for intermittently burning off carbon deposits from a heat-resistant exhaust gas filter of an internal combustion engine, said process comprising periodically applying a combustion initiating agent directly to said filter at a temperature sufficient to initiate combustion, said agent being applied in the presence of at least one complex forming metal, and said agent being selected from the group consisting of an organic complexing agent able to form a volatile, organometallic complex compound with said metal and a volatile, organometallic complex compound of said metal with an organic complexing agent.

4. Process according to claim 3, wherein a transition metal is used as the metal.

5. Process according to claim 3, wherein iron or copper is used as the metal.

6. Process according to claim 3, wherein at least a portion of the metal is already present on the exhaust gas filter and for initiating the burning off process organic complexing agent, optionally combined with the organometallic complex compound is added.

7. Process according to claim 6, wherein the portion of the metal on the exhaust gas filter is present in oxidic form.

8. Process according to claim 3, wherein a liquid organic complexing agent is used.

9. Process according to claim 3, wherein the filter is subdivided into filter units and the burning off of the carbon only takes place on part of the total available filter area and the exhaust gas does not flow through said part during the initiation of the burning off process.

10. Process according to claim 9, wherein the exhaust gas does not flow through the part of the filter area, on which the burning off of the carbon takes place, during the duration of the burning off.

11. Process according to claim 9, wherein the filter area to be burnt off is separated from the exhaust gas flow prior to the initiation of the burning off process and following the at least partial combustion of the carbon, the exhaust gas is again passed through the separated area of the filter material.

12. Process according to claim 3, wherein the combustion initiating agent is added all at once for initiating a burning off process.

13. Process according to claim 9, wherein after a period of time sufficient for at least partial burning of the carbon, exhaust gas again flows through that area of the filter on which the carbon was burnt.

14. Process according to claim 9, wherein that part of the filter surface on which the carbon was burnt is scavenged by compressed air.

15. Process according to claim 14, wherein the scavenging is carried out before and after the dosing in of the combustion initiating agent.

16. Process according to claim 14, wherein the air is added in heated form.

17. Process according to claim 3, wherein a further chemical substance capable for reducing the ignition temperature is added.

18. Process according to claim 12, wherein the combustion initiating agent is added within a period of 2 to 3 seconds.

19. Process according to claim 13, wherein the exhaust gas again flows through that area of the filter on which the carbon was burnt after 3 to 5 minutes.

20. A process for intermittently burning off carbon deposits from a heat-resistant exhaust gas filter of an internal combustion engine, said process comprising periodically applying a combustion initiating agent directly to said filter at a temperature sufficient to initiate combustion, said agent being applied in the presence of at least one complex forming metal, and said agent being selected from the group consisting of an organic complexing agent able to form an enol structure and complex with said metal and an organometallic complex compound of said metal with an organic complexing agent able to form an enol structure.

21. Process according to claim 20, wherein an organic complexing agent is used, in which the enol structure is formed by setting a tautomeric keto-enol equilibrium form a $\beta$-diketone.

22. A process according to claim 20, wherein a transition metal is used as the metal.

23. A process according to claim 20, wherein iron or copper is used as the metal.

24. A process according to claim 20, wherein at least a portion of said metal is already present on said exhaust gas filter, and organic complexing agent, optionally combined with the organometallic complex compound, is added in order to initiate the burning off process.

25. A process according to claim 24, wherein the portion of the metal already present on the exhaust gas filter is present in oxidic form.

26. A process according to claim 20, wherein a liquid organic complexing agent is used.

27. A process according to claim 20, wherein said filter is subdivided into filter units, and the burning off of the carbon takes place only on part of the total available filter area, and the exhaust gas does not flow through said part during the initiation of the burning off process.

28. A process according to claim 27, wherein the exhaust gas does not flow through the part of the filter area on which the burning off of the carbon takes place during the duration of the burning off.

29. A process according to claim 27, wherein the filter area to be burnt off is separated from the exhaust gas flow prior to the initiation of the burning off process, and following the at least partial combustion of the carbon, the exhaust gas is again passed through the separated area of the filter material.

30. A process according to claim 20, wherein the combustion initiating agent is added all at once for initiating a burning off process.

31. A process according to claim 27, wherein after a period of time sufficient for at least partial burning of the carbon, exhaust gas again flows through that area of the filter on which the carbon was burnt.

32. A process according to claim 27, wherein that part of the filter surface on which the carbon was burnt is scavenged by compressed air.

33. A process according to claim 32, wherein the scavenging is carried out before and after the application of the combustion initiating agent.

34. A process according to claim 32, wherein the air is added in heated form.

35. A process according to claim 20, wherein a further chemical substance capable of reducing the ignition temperature is added.

36. A process according to claim 30, wherein the combustion initiating agent is added within a period of 2 to 3 seconds.

37. A process according to claim 31, wherein the exhaust gas again flows through that area of the filter on which the carbon was burnt after 3 to 5 minutes.

38. A process for intermittently burning off carbon deposits from a heat-resistant exhaust gas filter of an internal combustion engine, said process comprising periodically applying directly to said filter at a temperature sufficient to initiate combustion a combustion initiating agent, said agent being applied in the presence of at least one complex forming metal, and said agent being selected from the group consisting of acetylacetone and an organometallic complex compound of said metal with acetylacetone.

39. Process according to claim 38, wherein copper acetylacetonate is used as the organometallic complex compound.

40. A process for intermittently burning off carbon deposits from a heat-resistant exhaust gas filter of an internal combustion engine, said process comprising periodically applying a combustion initiating agent directly to said filter at a temperature sufficient to initiate combustion, said agent being applied in the presence of at least one complex forming metal, and said agent comprising a solution of an organometallic complex compound of said metal with an organic complexing agent, wherein said complex compound is dissolved in the organic complexing agent.

41. A process for intermittently burning off carbon deposits from a heat-resistant exhaust gas filter of an internal combustion engine, said process comprising periodically applying a combustion initiating agent directly to said filter at a temperature sufficient to initiate combustion, said agent being applied in the presence of at least one complex forming metal, and said agent comprising an organometallic complex compound of said metal with an organic complexing agent, wherein said complex compound is present in powder form and is added in powder form for initiating the burning off process.

42. A process for intermittently burning off carbon deposits from a heat-resistant exhaust gas filter of an internal combustion engine, said process comprising periodically applying a combustion initiating agent directly to said filter at a temperature sufficient to initiate combustion, said agent being applied in the presence of at least one complex forming metal, and said agent being selected from the group consisting of an organic complexing agent able to form a complex with said metal and an organometallic complex compound of said metal with an organic complexing agent, wherein a pressure difference between the pressures upstream and downstream of said filter is monitored, and said agent is applied to the filter to initiate the burning off process when the pressure difference attains a value indicating the presence of carbon on said filter.

* * * * *